(12) United States Patent
Park et al.

(10) Patent No.: US 12,585,168 B2
(45) Date of Patent: Mar. 24, 2026

(54) ZOOMING ACTUATOR HAVING DUAL STRUCTURE

(71) Applicant: JAHWA electronics Co., Ltd., Chungcheongbuk-do (KR)

(72) Inventors: Chul Soon Park, Chungcheongbuk-do (KR); Je Seung Yeon, Chungcheongbuk-do (KR); Jae Seon Lee, Chungcheongbuk-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 313 days.

(21) Appl. No.: 18/283,533

(22) PCT Filed: Mar. 24, 2022

(86) PCT No.: PCT/KR2022/004119
§ 371 (c)(1),
(2) Date: Sep. 22, 2023

(87) PCT Pub. No.: WO2022/211366
PCT Pub. Date: Oct. 6, 2022

(65) Prior Publication Data
US 2024/0103341 A1      Mar. 28, 2024

(30) Foreign Application Priority Data

Mar. 31, 2021    (KR) ........................ 10-2021-0041579

(51) Int. Cl.
*G03B 5/02*      (2021.01)
*H04N 23/51*      (2023.01)

(52) U.S. Cl.
CPC .............. *G03B 5/02* (2013.01); *H04N 23/51* (2023.01); *G03B 2205/0046* (2013.01); *G03B 2205/0069* (2013.01)

(58) Field of Classification Search
CPC .... G03B 2205/0069; G03B 5/00; G03B 3/10; G03B 13/36; G03B 17/12; G03B 30/00;
(Continued)

(56) References Cited

U.S. PATENT DOCUMENTS

2018/0100984 A1*    4/2018   Wu ........................... G03B 5/00

FOREIGN PATENT DOCUMENTS

KR    10-2006-0017168 A    2/2006
KR    10-2019-0128279 A    11/2019
(Continued)

OTHER PUBLICATIONS

International Search Report for PCT/KR2022/004119 mailed on Jun. 27, 2022.

*Primary Examiner* — Brandi N Thomas
(74) *Attorney, Agent, or Firm* — The PL Law Group, PLLC

(57)      ABSTRACT

A dual set-up zoom actuator includes a first carrier having a first lens and movable along an optical axis, a second carrier having a second lens and being capable of moving anterior or posterior to the first carrier along the optical axis, a housing enclosing the first and second carriers, a first coil unit equipped to the housing and having n, which is a natural number not less than two, first coils disposed anterior or posterior along the optical axis, a second coil unit equipped to the housing at a location different than the first coil unit and having n+1 second coils disposed anterior or posterior along the optical axis, a first magnet having n+1 magnetic poles facing the first coil unit and mounted on the first carrier, and a second magnet having n magnetic poles facing the second coil unit and mounted on the second carrier.

6 Claims, 7 Drawing Sheets

(58) Field of Classification Search
CPC .... G03B 2205/0046; G03B 2205/0007; G03B
3/00; H04N 23/51; H04N 23/55; H04N
23/00; G02B 27/646; G02B 7/04; G02B
7/08; G02B 7/09; G02B 7/021; G02B
7/02; G02B 7/10; G02B 7/022; G02B
27/64; G02B 13/003; G02B 7/1828;
G02B 7/00; H02K 33/18; H02K 11/215
See application file for complete search history.

(56) References Cited

FOREIGN PATENT DOCUMENTS

| KR | 10-2020-0035522 A | 4/2020 |
| KR | 10-2020-0043056 A | 4/2020 |
| KR | 10-2020-0056577 A | 5/2020 |

* cited by examiner

ZOOMING ACTUATOR HAVING DUAL STRUCTURE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/004119 filed on Mar. 24, 2022, which claims priority to the benefit of Korean Patent Application No. 10-2021-0041579 filed in the Korean Intellectual Property Office on Mar. 31, 2021, the entire contents of which are incorporated herein by reference.

BACKGROUND

1. Technical Field

The present disclosure relates to an actuator for zoom driving. More particularly, the present disclosure relates to a dual set-up zoom actuator configured to have two different sets of electromagnetic driving units for moving the lens.

2. Background Art

Advances in hardware technology for image processing and growing consumer need for making and taking photos and videos have driven implementation of such functions as autofocusing and optical image stabilization in stand-alone cameras as well as camera modules mounted on mobile terminals including cellular phones and smartphones.

Furthermore, recent years have seen actuators for zoom lens that supports variable adjustment features including the object size by tuning the focal length through such functions as zoom-in and zoom-out. In certain models of actuators, further diversification in implementing zoom has been attainable through combinations in the positional relationship among plural lenses (lens assembly).

Since zoom lenses have longer or extended distances of movement along the optical axis (also referred to as stroke) than ordinary lenses, the actuators used for their driving must accordingly be designed to exert sufficient driving force. Furthermore, their design should enable accurate detection and feedback control of the corresponding position of the zoom lenses across the entire stroke range.

Actuators known in the art, however, simply had multiple installment of an element for driving carriers with each such element working independent of one another, which necessitated limits on the allowable moving range for the purpose of preventing physical interference among the plural moving bodies (carriers) that drive each lens along the optical axis. They were thus unsuited for zoom driving which involves extensive displacements.

In addition, as art-known actuators required independent and sufficient moving range for each moving body (carrier) to meet the intended optical property specifications, their use demanded spatial design in which each carrier was secured its own space for movement, and this caused unavoidable inflation in device dimensions (length) along the optical axis.

Accordingly, the poor space utilization of art-known devices (actuators) made them unsuited for applications such as smart phones where size or volume was a significant issue.

SUMMARY

The present disclosure has been contemplated to solve the aforementioned problems of the related art in the context mentioned above. It is a technical goal of the present invention to achieve a more effective utilization of space for the actuator. It is another technical goal to provide a zoom actuator with higher efficiency and better precision over an extended stroke range by means of precise positional relationship between the magnets and coils.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

To achieve the technical goals mentioned above, in one aspect of the present disclosure is provided a dual set-up zoom actuator which includes a first carrier having a first lens attached thereto and movable along an optical axis; a second carrier having a second lens attached thereto, said second carrier being capable of moving anterior or posterior to the first carrier along the optical axis; a housing enclosing the first and second carriers; a first coil unit equipped to the housing and having n (n being a natural number equal to or greater than two) first coils disposed anterior or posterior along the optical axis; a second coil unit equipped to the housing at a location different than the first coil unit and having n+1 second coils disposed anterior or posterior along the optical axis; a first magnet having n+1 magnetic poles facing the first coil unit and mounted on the first carrier; and a second magnet having n magnetic poles facing the second coil unit and mounted on the second carrier.

In an embodiment, the first carrier includes a first mount equipped with the first lens; and a first support fitted on the first mount, either left or right thereto in which the first support is equipped with the first magnet and extends longer along the optical axis than the first mount.

In another embodiment, the second carrier includes a second mount equipped with the second lens; and a second support fitted on a side of the second mount, either to the left or right thereof, but opposite the side the first support is fitted thereon in which the second support is equipped with the second magnet and extends longer than the second mount along the optical axis. It is preferable that the second support extends in a direction opposite to the direction the first support extends therein.

In a further embodiment, each of the n first coils is wound to a track-shaped form including an upside and a bottomside, with the upside and bottomside formed along a direction perpendicular to the optical axis, and for each pair of two consecutive first coils consisting of a higher first coil and a lower first coil placed at a location lower than the higher first coil, the bottomside of the higher first coil and the upside of the lower first coil preferably face the same magnetic pole out of the n+1 magnetic poles of the first magnet.

In a further embodiment yet, each of the n+1 second coils is wound to a track-shaped form including an upside and a bottomside, with the upside and bottomside formed along a direction perpendicular to the optical axis, into an upside and a bottomside, and for each trio of three consecutive second coils consisting of a higher second coil, a middle second coil placed in the middle and a lower second coil placed at a location lower than the middle second coil, the bottomside of the higher second coil and the upside of the middle second coil preferably face the higher magnetic pole from the pair of two consecutive magnetic poles out of the n magnetic poles of the second magnet, and the bottomside of the middle second coil and the upside of the lower second coil preferably face the lower magnetic pole from the pair of two consecutive magnetic poles out of the n magnetic poles of the second magnet.

In a more detailed embodiment, the magnetic border within the pair of two consecutive magnetic poles preferably moves between the upside and the bottomside of the middle second coil.

According to a preferred embodiment of the present disclosure, a physical arrangement of plural carriers in symmetrically opposing directions not only affords sufficient scope for independent movement for each lens (lens assembly) attached to each carrier, but also enables implementation for the entire device in a spatially more compact structure and shape, which makes it optimal for minimizing the overall size and slimming of the mobile terminal.

According to a preferred embodiment of the present disclosure, improved correlation between the magnet mounted on each of the plural carriers and each of the coils placed facing each magnet to generate electromagnetic force therein allows accurate driving force production over the entire moving range of each carrier, thereby affording improvements in driving behavior as well as driving precision.

According to another embodiment of the present disclosure, constructing two different set-ups consisting of magnets and coils that together generate the driving force for each of the plural carriers, allows maximal spatial utilization by guaranteeing sufficient room for independent movement of each carrier even for optical designs that require plural carriers with differing movement ranges.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
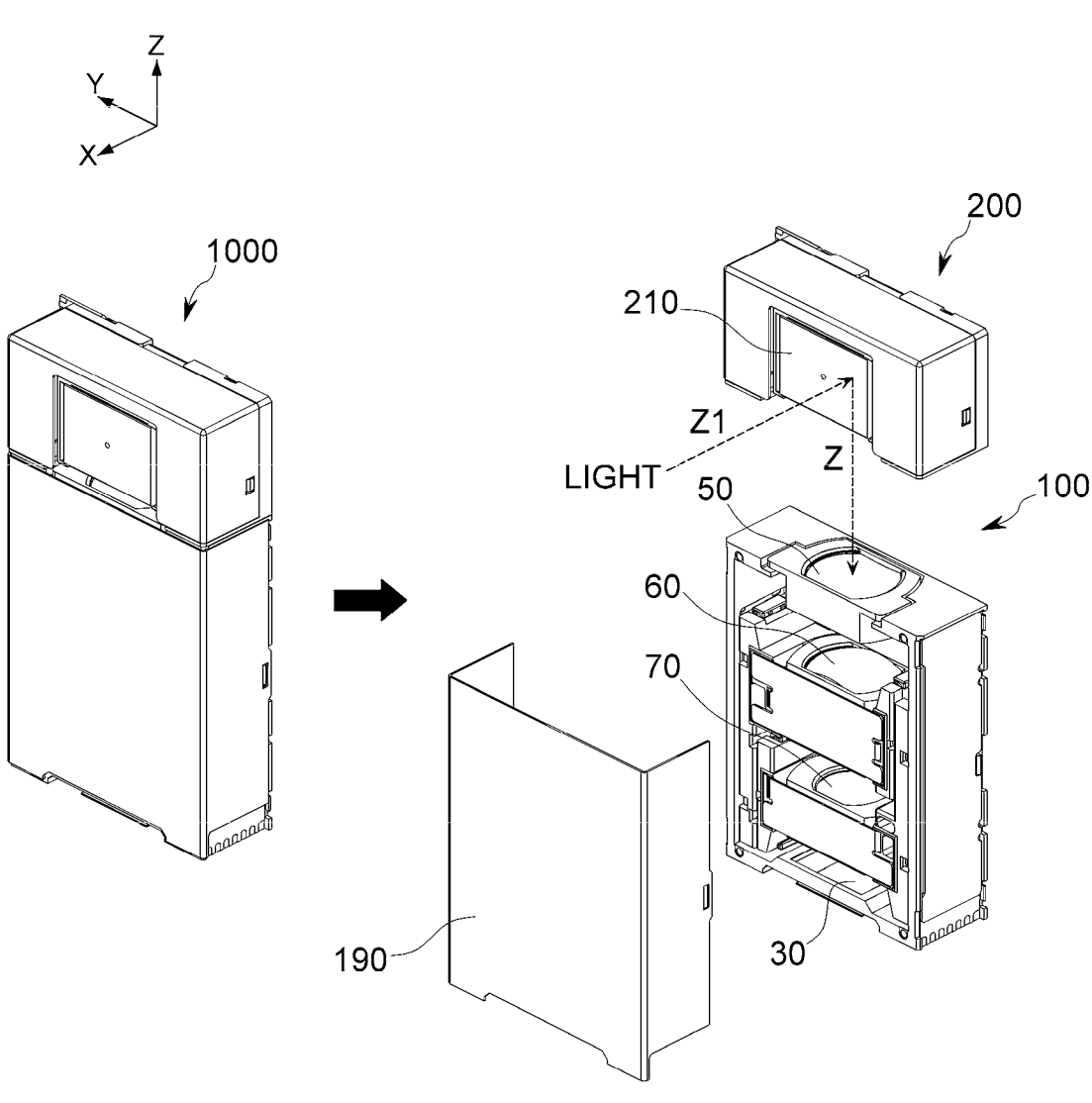
FIG. 1 depicts the overall configuration of a zoom actuator and a camera module in accordance with a preferred embodiment of the present invention.

FIG. 1 depicts the overall configuration of a dual set-up zoom actuator (hereinafter referred to simply as "actuator") (100) and a camera module (1000) in accordance with a preferred embodiment of the present invention.

The actuator (100) of the present invention can be embodied along with such other parts as a reflectometer module (200) as part of a camera module (1000) as illustrated in FIG. 1, not to mention as a single stand-alone device.

As will be described in detail below, the actuator (100) of the present invention is for carrying out autofocusing or zooming by moving in a linear motion along the optical axis each of a plurality of carriers to which the lens (lens assembly) is attached.

The reflectometer module (200), which can be set up anterior to (along the optical axis) the actuator (100) of the present invention, reflects or refracts the optical path (Z1) of the object towards a path in the direction of the lens (Z, optical axis). The light thus reflected or refracted towards the optical axis passes the lens (lens assembly) (60 or 70) attached to the carrier (120 or 130) and enters the image sensor such as complementary metal oxide semiconductor (CMOS) and charge coupled device (CCD).

The reflectometer module (200) for modifying the optical path may include a reflectometer (210) that consists of one selected from a mirror and a prism or a combination of both. The reflectometer (210) may be comprised of any material capable of modifying the path of the incoming light from the outside toward the optical axis, but for the purpose of high performance optical properties, glass is the preferred medium.

The camera module (1000) of the present invention including the reflectometer module (200) and the like is configured to refract the path of light toward the lens. This allows the entire device to be set up lengthwise along the mobile terminal instead of across the width so as to keep the mobile terminal thin, making it optimal for miniaturization and slimming of mobile terminals.

In certain embodiments, the reflectometer (210) is configured to move in a rotational motion by the action of a driving means capable of generating magnetic force such as magnets and coil. Thus, as the reflectometer (210) moves or moves in a rotational motion, the light from the object reflected (refracted) by the reflectometer (210) is led along the ±Y-axis and/or ±X-axis, thereby enabling corrections to camera shake along the X-axis and/or Y-axis.

The light from the object thus reflected by the reflectometer module (200) enters into the first lens (60) and second lens (70) equipped within the actuator (100), and functions such as zooming and autofocusing are performed by the actuator (100) of the present invention by making combinatorial adjustments to the position of each of the first (60) and second (70) lenses along the optical axis.

As described hereinafter, the optical axis (Z-axis) is defined as the axis corresponding to the path of the incoming light, e.g., into the first lens (60) and the two axes spanning a plane perpendicular to the optical axis (Z-axis) are defined as the X-axis and Y-axis.

Figure 2:
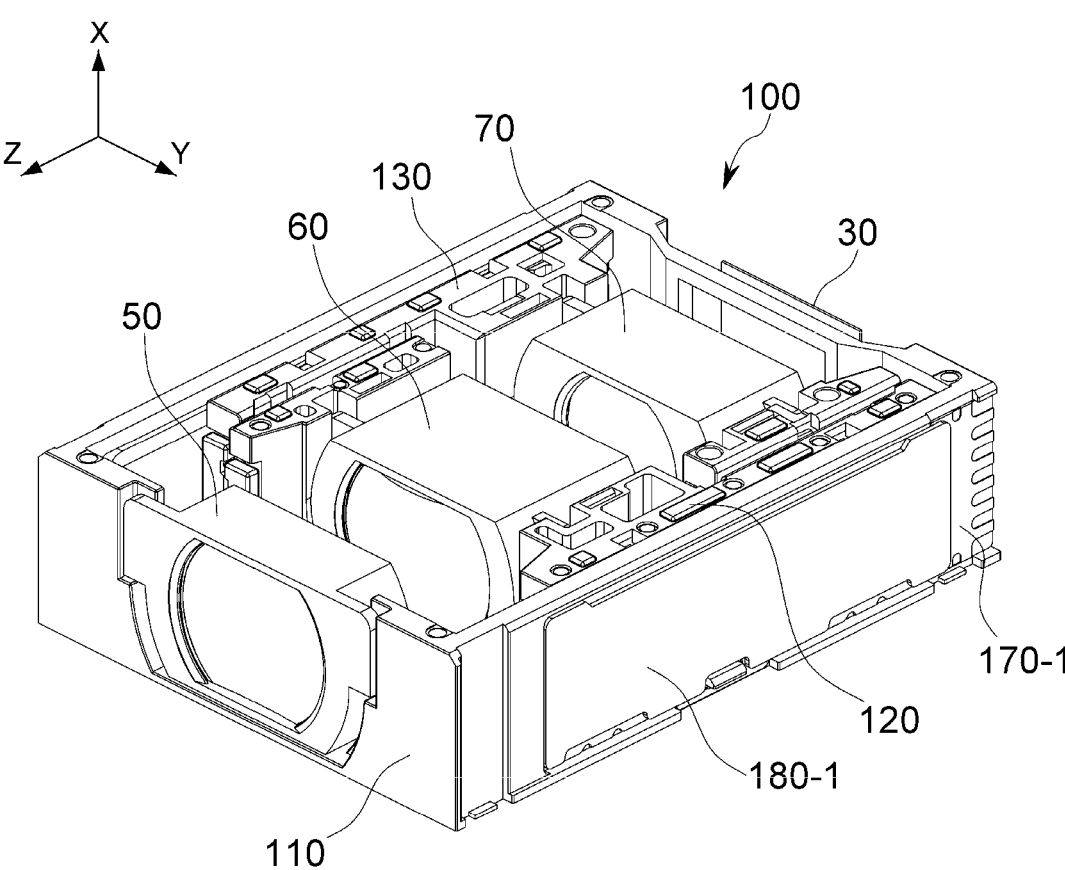
FIG. 2 illustrates the overall configuration of a zoom actuator in accordance with a preferred embodiment of the present invention.

FIG. 2 illustrates the overall configuration of an actuator (100) in accordance with a preferred embodiment of the present invention.

As illustrated in FIG. 2, the actuator (100) of the present invention includes a housing (110), which amounts to the base frame accommodating the inner parts, a casing (190, see FIG. 1) attached to the housing (110) and capable of functioning as a shield can, a first carrier (120) and a second carrier (130).

Each of the first carrier (120) with a first lens (60) attached thereto and the second carrier (130) with a second lens (70) attached thereto amounts to a moving body in linear motion along the optical axis (Z-axis), while correspondingly the housing (110) amounts to a fixed body.

In the embodiment illustrated in FIG. 2 and the like, the second carrier (130) is placed posterior to the first carrier (120) along the optical axis and it maintains such arrangement when moving in a linear motion along the optical axis.

As will be described below, the first carrier (120) is equipped with a first magnet (M1) and in the housing (110) is equipped a first coil unit (C1) that faces and imparts driving force to the first magnet (M1).

Control by a first operating driver (150A) applies power of appropriate magnitude and direction to the first coil unit (C1), which generates electromagnetic force between the first coil unit (C1) and the first magnet (M1), to move the first carrier (120) back and forth along the optical axis.

Similarly, once a second operating driver (150B) exerts control to apply power of appropriate magnitude and direction to a second coil unit (C2), electromagnetic force generated between the second coil unit (C2) and a second magnet (M2) equipped to the second carrier (130) moves the second carrier (130) linearly along the optical axis.

Although the accompanying figures illustrate a first carrier (120) to which a first lens (60) is attached and a second carrier (130) to which a second lens (70) is attached, this is only one of the possible examples. Needless to say, further numbers of lenses and carriers can be included depending on the particular embodiment.

Hereinafter, for the purposes of efficient description, the number of carriers illustrated as being included in an actuator (100) will be two in the examples, and in addition, the carrier placed anterior along the optical axis shown in FIG. 2 will be designated as the first carrier (120), while the carrier placed posteriorly as the second carrier (130).

Thus, as each of the first carrier (120) and the second carrier (130) moves linearly along the optical axis, so does each lens (60 or 70) attached to each carrier, and through the positional relationship between these lenses, zooming or auto-focusing is implemented.

As explained above, a fixed lens (50) can be set up anterior to the first lens (60) (along the optical axis) in certain embodiments to suit the optical performance or specification of the actuator (100).

To prevent outward leakage of electromagnetic force generated in the first coil unit (C1) and to sharpen the focus of this force toward the first magnet (M1), a yoke plate (180-1) made of metallic material may be placed on the opposite side facing the first magnet (M1).

Furthermore, balls are preferably placed between the first carrier (120) and the housing (110) and between the second carrier (130) and the housing (110) in order to set the first carrier (120) and the second carrier (130) in smooth linear motion with the least friction.

Figure 3:
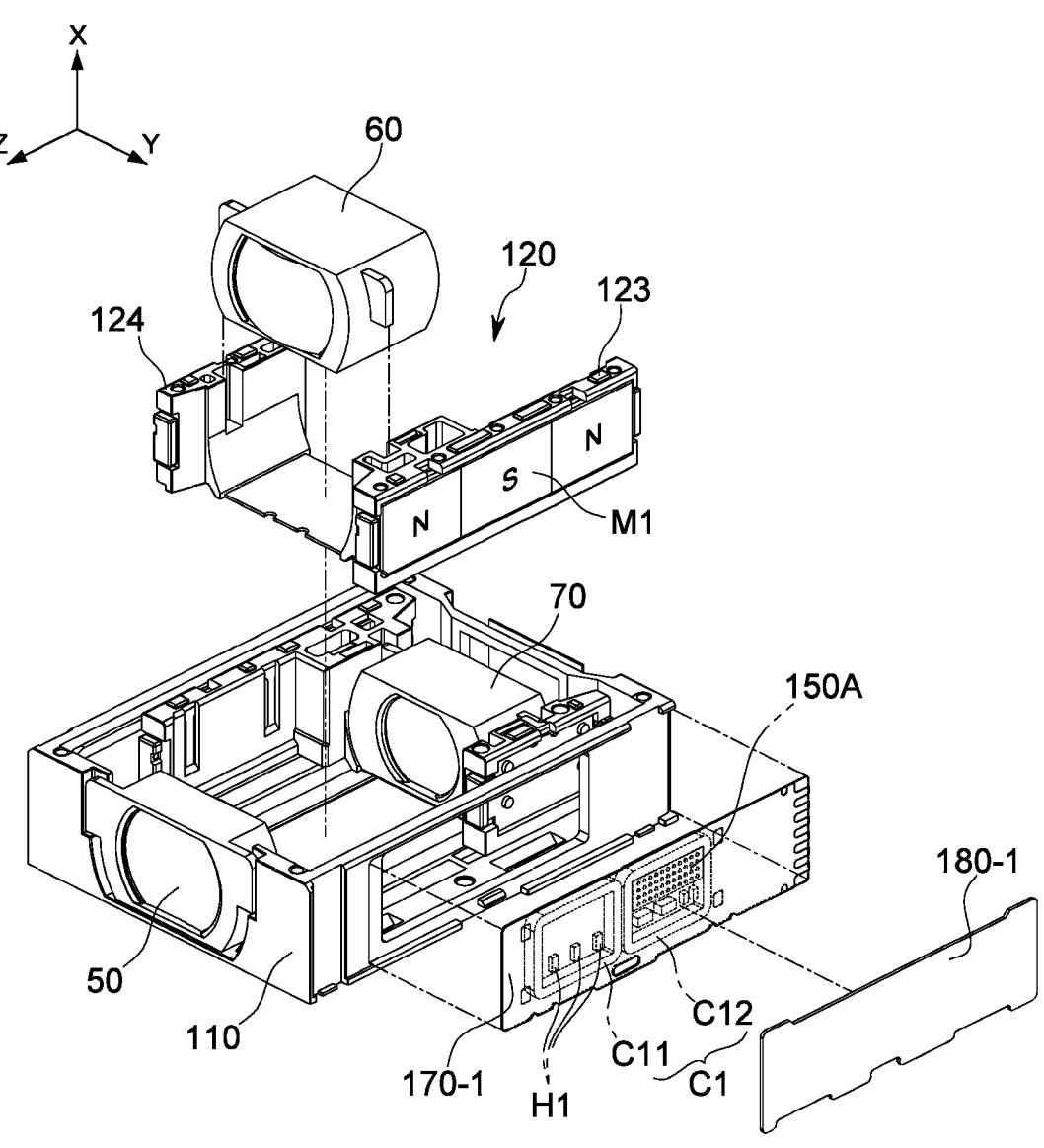
FIG. 3 illustrates the configuration in detail of the first carrier and the accompanying elements according to an embodiment of the present invention.

FIG. 3 illustrates the configuration of the first carrier (120) and the accompanying elements according to an embodiment of the present invention.

As described above, the first carrier (120) of the present invention to which the first lens (60) is attached is a moving body in linear motion along the optical axis. More particularly, the first carrier (120) includes a first mount (124) equipped with the first lens (60) and a first support (123) carrying the first magnet (M1).

The first mount (124) as illustrated in the figures, is shaped to match that of the first lens (first lens assembly) (60) so that it can mount the first lens (60). In certain embodiments, a casing (see FIG. 1) can be provided to the first mount (124) to prevent the first lens (60) from being dislocated, e.g., along the X-axis.

The first support (123) equipped with the first magnet (M1) is fitted on the first mount (124) either to its left or right, and extends, as illustrated in the figures, along the optical axis longer than the first mount (124).

The first support (123) may be made integral with the first mount (124), and for the purpose of forming a physical structure symmetric with the second support (133) of the second carrier (130) as will be described later, preferably has a shape extending along one of the optical axes (Z-axis).

Since the first support (123) of the present invention as described has an elongated shape along the optical axis, it is capable of carrying a first magnet (M1) enlarged in proportion to the extended range while maintaining the overall size of the first carrier (120), which contributes to further strengthening of the first carrier's (120) driving force.

The first coil unit (C1) mounted to the housing (110), preferably consists of n first coils placed anterior or posterior along the optical axis to augment the driving force. It is preferred that the first magnet (M1) is correspondingly configured to have $n+1$ magnetic poles facing the first coil unit (C1). The n herein is a natural number equal to or larger than two.

As an embodiment as described above, FIG. 3 illustrates a configuration including a first coil unit (C1) consisting of two separate first coils (C11, C12) and a first magnet (M1) in which three magnetic poles face the first coil unit (C1).

Configuring the first magnet (M1) to have magnetic poles facing the first coil unit (C1) in a number exceeding the number of separate coils as described above enhances the driving efficiency by sustained transmission of electromagnetic force by the first coil unit (C1) to the first magnet (M1) since such arrangement keeps the first coil unit (C1) facing two or more magnetic poles from the first magnet (M1) even in the movement of the first magnet (M1) as the first carrier (120) moves along the optical axis.

The first Hall sensor (H1) is an element mounted on the first circuit board (170-1) together with the first coil unit (C1) and the first operating driver (150A). The first Hall sensor (H1), through the Hall effect, detects the magnitude and the direction of magnetic field generated from the first magnet (M1) that faces it and generates an output signal corresponding to the field.

The first Hall sensor (H1) is preferably installed in a plural number so that the first carrier (120) can be precisely located as it moves along the optical axis. In such case, the first operating driver (150A) of the present invention controls the processing of the output signals received from each of the plural first Hall sensors (H1) by carrying out operations on them so that power of a magnitude and direction commensurate with the operational outcome is applied to the first coil unit (C1). The second operating driver (150B) and the second Hall sensor (H2) will be described in detail below.

Figure 4:
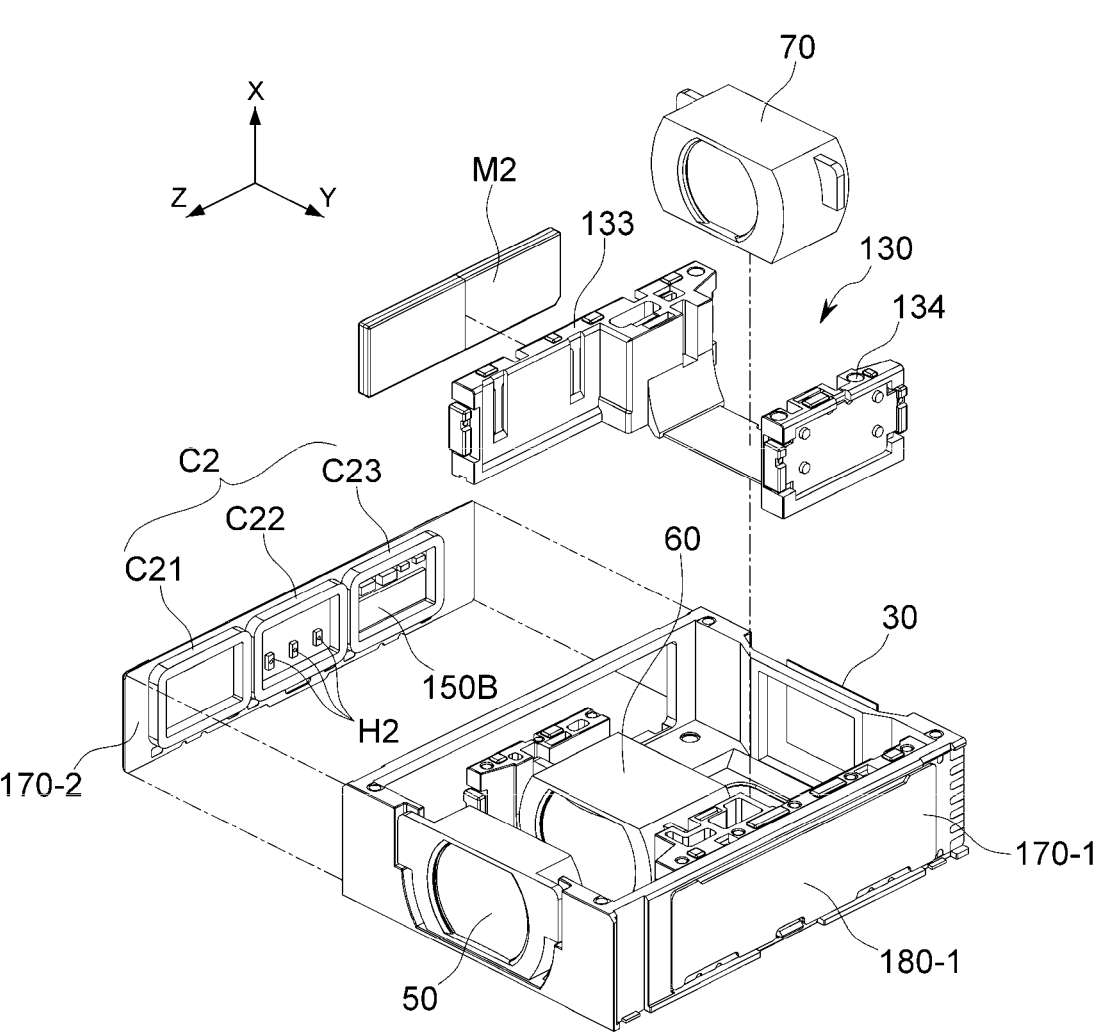
FIG. 4 illustrates the configuration in detail of the second carrier and the accompanying elements according to an embodiment of the present invention.
Figure 5:
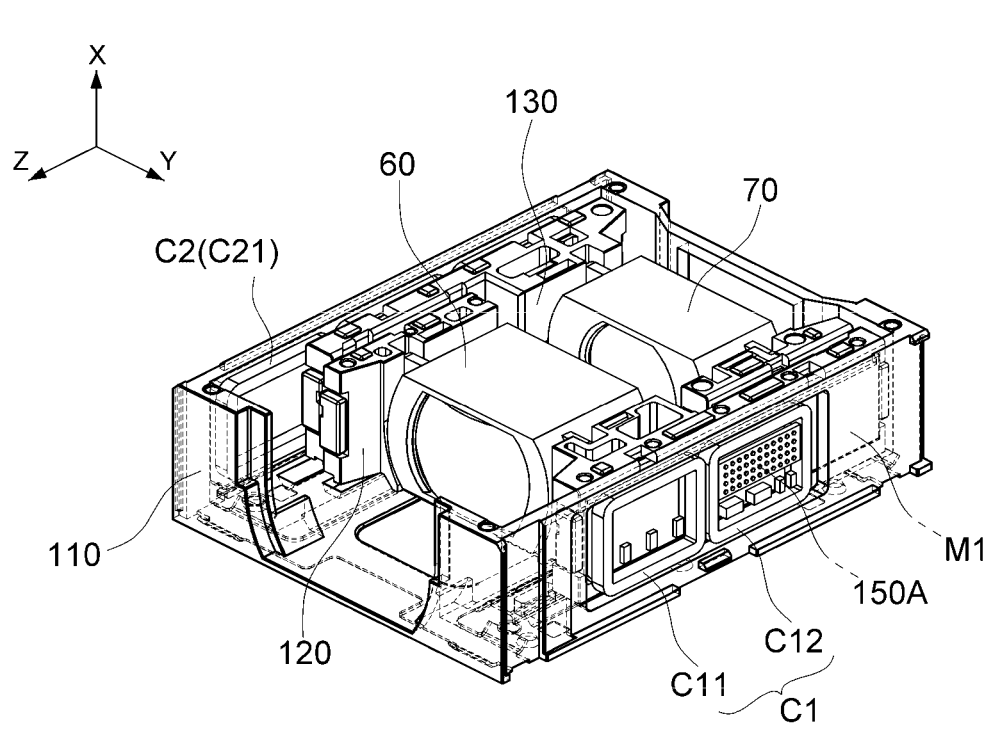
FIG. 5 depicts the relationship between the first magnet and the first coil unit as well as that between the second magnet and the second coil unit.
Figure 5:
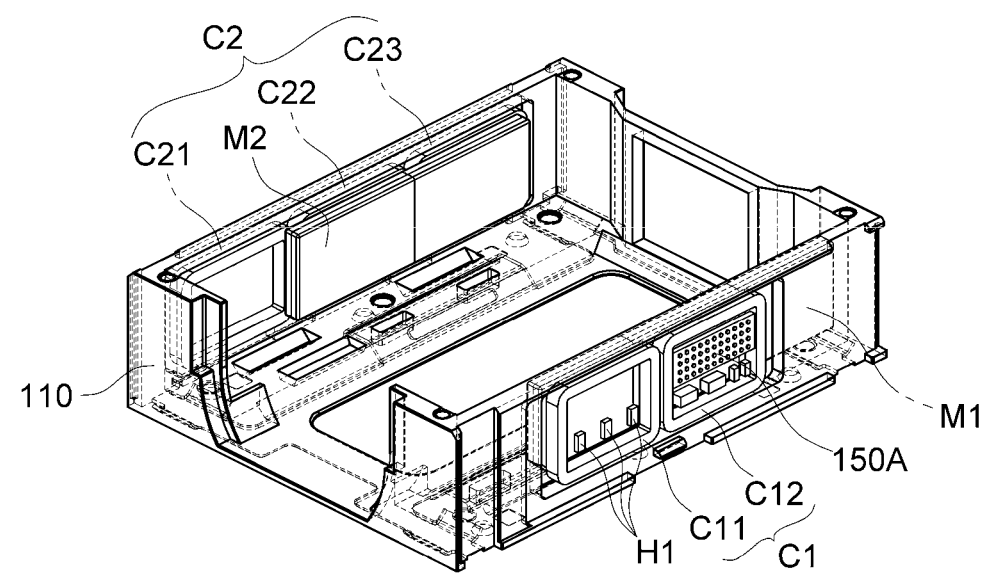

FIG. 4 is a diagram depicting the configuration of the second carrier (130) and the accompanying elements according to an embodiment of the present invention. FIG. 5 depicts the relationship between the first magnet (M1) and the first coil unit (C1) as well as that between the second magnet (M2) and the second coil unit (C2).

The second carrier (130) has a physical structure commensurate with the first carrier (120) described above, and is formed symmetrically in the opposite direction with respect to the first carrier (120) as shown in the figures.

More particularly, the second carrier (130) includes a second mount (134) equipped with a second lens (70) and a second support (133) carrying the second magnet (M2).

The second support (133) of the second carrier (130) is fitted on a side of the second mount (134), either to its left or right, but opposite the side the first support (123) of the first carrier (120) is fitted on. Furthermore, the second support (133) is shaped to extend longer than the second mount (134) along the optical axis in a direction opposite to that of the first support (123) of the first carrier (120).

The physical structures of the first carrier (120) and the second carrier (130) are thus overall similar. By locating the first mount (124) equipped with the first lens (60) and the second mount (134) equipped with the second lens (70) on the middle part (based on the Y-axis), sufficient ranges can be secured for the movement of the first (60) and second (70) lenses.

Simultaneously, the first (M1) and second (M2) magnets for driving respectively, the first (120) and second carriers (130) can be provided in larger sizes by means of the first (123) and second (133) supports with the view to effectively augmenting the driving force.

Furthermore, the first (M1) and second (M2) magnets are placed apart from each other, respectively to the left and right (based on the Y-axis). In correspondence, the first (C1) and second (C2) coil units, each facing respectively, the first (M1) and second (M2) (M2) magnets, are accordingly placed apart.

Setting far apart the first magnet (M1) and the first coil unit (C1) as well as the second magnet (M2) and the second coil unit (C2) from each other as described allows the inventive actuator to eliminate from the beginning, interference and influence among the electromagnetic force employed for driving each carrier, leading to independent driving of the first (120) and second (130) carriers with more precision.

The second coil unit (C2) mounted to the housing (110), preferably consists of n+1 second coils disposed anterior or posterior along the optical axis to augment the driving force. It is preferred that the second magnet (M2) that faces the second coil unit (C2) is correspondingly configured to have n magnetic poles facing the second coil unit (C2).

As a relevant embodiment t, FIG. 4 illustrates a configuration including a second coil unit (C2) consisting of three (n=2 in this case) separate second coils (C21, C22, C23) and a second magnet (M2) in which two magnetic poles (n=2 in this case) face the second coil unit (C2).

Setting up, as described above, a larger number of individual second coils to face the second magnet (M2) than the number of magnetic poles faced by them enhances the driving efficiency by providing sustained transmission of magnetic force by the second coil unit (C2) to the second magnet (M2) because such arrangement keeps the second magnet (M2) within the region of electromagnetic field formed by the second coils (C21, C22, C23) even in the case of the second magnet (M2) moving in concert to the motion of the second carrier (130) along the optical axis.

Describing an embodiment in which n equals 2, the first coil unit (C1) consists of two first coils (C11, C12), the first magnet (M1) of three magnetic poles, the second coil unit (C2) of three second coils (C21, C22, C23) and the second magnet (M2) of two magnetic poles.

Thus, the actuator (100) of the present invention achieves independent driving of each of the plural carriers (120, 130) as it is set up with two separate driving units (coils and magnets) for the carriers (120, 130).

There may also be embodiments in which it may be preferable, for the purposes of driving and efficiency in control, to have more magnetic poles than the number of individual coils in the magnets mounted on the carriers which themselves are moving bodies, when magnetic properties of coils and the magnets that face them are taken into account.

When taking the approach in which the sizes of the magnets and coils are fixed parameters, a magnet mounted on a moving body having many magnetic poles that face the coils indicates a large-sized one, and this in turn requires accordingly expanded dimensions for the actuator (100).

These considerations simply mean that constructing all plural carriers the same as described above entails expansion in the overall size of the actuator (100) to harm spatial efficiency.

Implementing zooming and autofocusing functions by means of relative positioning of plural lenses may involve setting up individual lenses to have varying ranges of movement depending on the optical properties of the lens.

In such embodiments involving plural lenses, further efficiency in spatial utilization can be attained by setting up the number of magnetic poles in the magnet facing the coils in two ways according to the range of movement of the lens as determined from optical properties and etc. so that more magnetic poles than the coils are installed for those lenses with relatively small ranges while fewer magnetic poles than the coils are installed for those with relatively large ranges.

Based on the embodiments of the present invention, the set-up with a first coil unit (C1) consisting of n first coils and a first magnet (M1) having n+1 magnets corresponds to those with small ranges while the set-up with a second coil unit (C2) consisting of n+1 coils and a second magnet (M2) having n magnetic poles corresponds to those with large ranges.

As illustrated in FIG. 5, the actuator (100) of the present invention is configured with two different driving set-ups consisting of a first driving unit (including the first magnet (M1) and the first coil unit (C1)) for driving the first carrier (120) to which a first lens (60) is attached and a second driving unit (including the second magnet (M2) and the second coil unit (C2)) for driving the second carrier (130) to which a second lens (70) is attached.

For a particular embodiment in which n equals 2, the first magnet (M1) mounted on the first carrier (120) has three (n+1) magnetic poles, and the first coil unit (C1) facing the first magnet (M1) consists of two (n) first coils (C11, C12).

Furthermore, the second magnet (M2) mounted on the second carrier (130) has two (n) magnetic poles, and the second coil unit (C2) facing the second magnet (M2) consists of three (n+1) second coils (C21, C22, C23).

Thus, the dual set-up for driving allows reduction in size for the second magnet (M2) compared to the case of the first magnet (M1), which in turn affords commensurate expansion in room for movement compared to the first magnet's (M1) room for movement.

Figure 6:
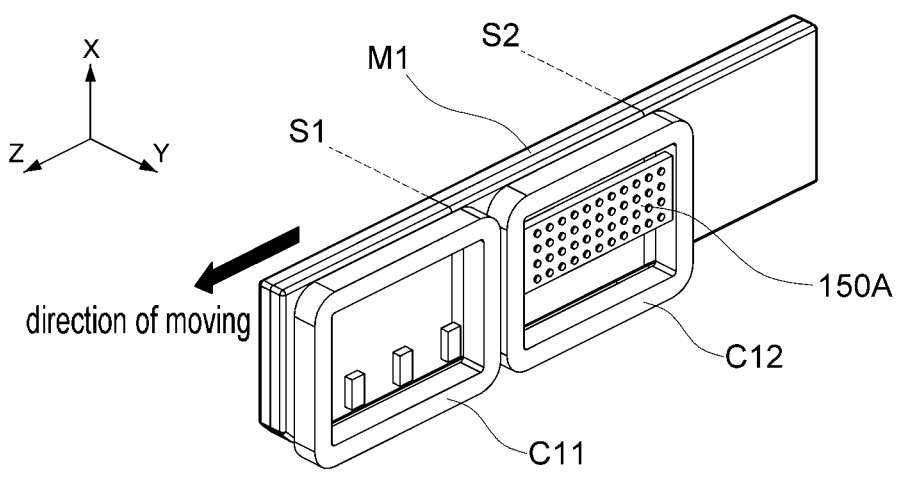
FIG. 6 illustrates the detailed configuration of the first coil unit and the first magnet.
Figure 6:
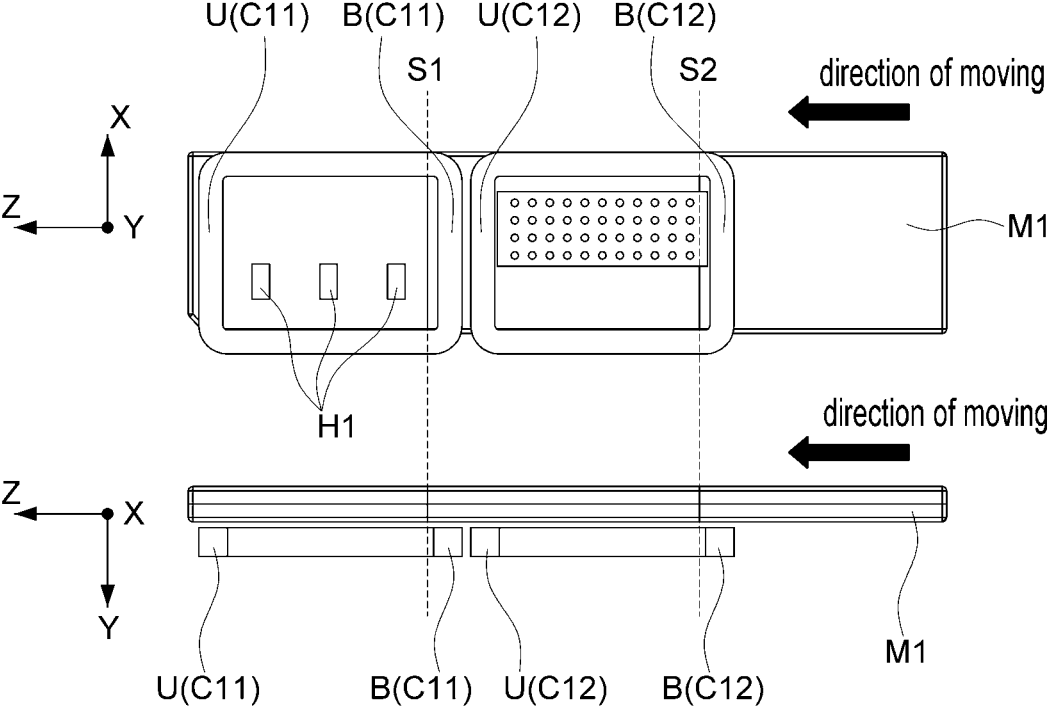

FIG. 6 illustrates the detailed configuration of the first coil unit (C1) and the first magnet (M1) for an embodiment in which the first coil unit (C1) is located at the default position. Needless to say, the default position may be set at a location different than the one depicted in the embodiment.

The two (in this case n=2) first coils (C11, C12) constituting the first coil unit (C1) are usually wound to form a shape of field track and via their interaction with the first magnet (M1) facing them generate driving force in a region running perpendicular to the optical axis (Z-axis).

Hereinafter in the description, between the pair of regions formed along a direction perpendicular to the optical axis in each of the field track-shaped first coils (C11, C12), the anterior (in the direction of the optical axis) region is designated the upside (U) and the posterior region is designated the bottomside (B).

In addition, between the first coils (C11, C12), the first coil at a higher location (in the direction of the optical axis) is designated the higher first coil (C11) and the first coil at a lower location is designated the lower first coil (C12).

In other words, in any pair of two consecutive first coils out of the n first coils, the first coil at a higher location is designated the higher first coil and the first coil placed at a location lower than the higher first coil is designated the lower first coil.

As illustrated in FIG. 6, the bottomside (B) of the higher first coil (C11) and the upside (U) of the lower first coil (C12) are configured to face the same magnetic pole out of the three (in the case n+1=3) magnetic poles of the first magnet (M1).

In an embodiment with n=2 as illustrated in FIG. 6, the bottomside (B) of the higher first coil (C11) and the upside (U) of the lower first coil (C12) can be configured to simultaneously face the middle magnetic pole of the first magnet (M1) that is located between the higher magnetic border (S1) and the lower magnetic border (S2).

In such configuration of magnets and coils, controlling the direction of current induced in each of the higher first coil (C11) and the lower first coil (C12) so that one is clockwise and the other counterclockwise affords reinforcement in the electromagnetic forced generated, leading to higher driving efficiency.

When the first carrier (120) is placed at the default position, the plurality of first Hall sensors (H1) are preferably placed at different locations (along the optical axis) to one another, but together face the same magnetic pole from the n+1 magnetic poles of the first magnet (M1).

Such configuration as described above enables more accurate and precise processing in locating the first carrier (120) by comparing differences in the output signals generated in response to the movement of the first carrier (120) from each of the plurality of the first Hall sensors (H1) upon applying statistical operations such as summation and subtraction.

Figure 7:
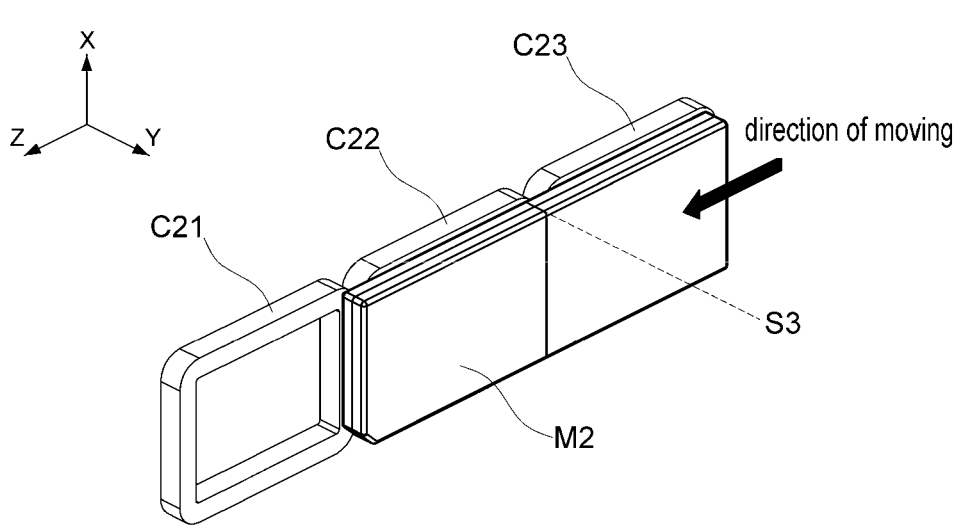
FIG. 7 illustrates the detailed configuration of the second coil unit and the second magnet.
Figure 7:
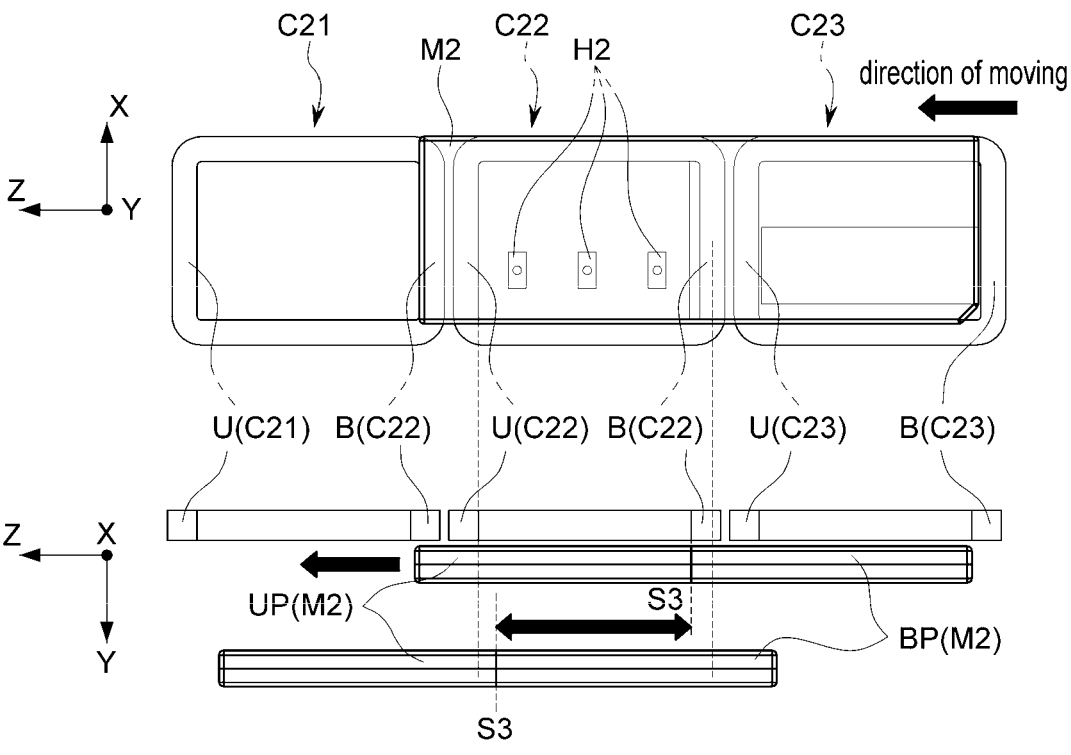

FIG. 7 illustrates the detailed configuration of the second coil unit (C2) and the second magnet (M2) for an embodiment in which the second coil unit (C2) is located at the default position. Needless to say, the default position may be set at a location different than the one depicted in the embodiment.

As illustrated in FIG. 7, the three (in the case of n+1=3) second coils (C21, C22, C23) constituting the second coil unit (C2) can be formed in the shape of a field track like the first coils (C11, C12).

Between the pair of regions formed along a direction perpendicular to the optical axis in each of the field track-shaped second coils (C21, C22, C23), the anterior (in the direction of the optical axis) region is designated the upside (U) and the posterior region is designated the bottomside (B) in the same way as explained for the first coils (C11, C12).

In addition, in any trio of three consecutive second coils out of the n+1 second coils, the second coil at a higher location is designated the higher second coil, the second coil at the middle is designated the middle second coil and the second coil placed at a lower location is designated the lower second coil.

With reference to the embodiment illustrated in FIG. 7, among the second coils (C21, C22, C23), the one at the highest position (C21) along the optical axis is designated the higher second coil, the one at the lowest position (C23) is designated the lower second coil and the one located in between (C22) is designated the middle second coil (C22).

As illustrated in FIG. 7, the bottomside (B) of the higher second coil (C21) and the upside (U) of the middle second coil (C22) are configured to face the higher magnetic pole (UP) out of the two magnetic poles of the second magnet (M2), while the bottomside (B) of the middle second coil (C22) and the upside (U) of the lower second coil (C23) are configured to face the lower magnetic pole (BP) out of the two magnetic poles of the second magnet (M2).

In a generalized perspective, among the trio of three consecutive second coils out of the n+1 second coils, the bottomside of the higher second coil and the upside of the middle second coil are configured to face the higher magnetic pole from the two consecutive magnetic poles out of the n magnetic poles of the second magnet, while the bottomside of the middle second coil and the upside of the lower second coil are configured to face the lower magnetic pole.

In this configuration of magnets and coils, controlling the direction of current induced to alternate in each of the higher second coil (C21), the middle second coil (C22) and the lower second coil (C23) affords reinforcement in the electromagnetic forced generated for not only the higher magnetic pole but the lower magnetic pole as well, which leads to higher driving efficiency.

More particularly, the stroke range for the second carrier (130), the size of the second magnet (M2) and the second coils (C21, C22, C23) are preferably designed so as to keep the magnetic border (S3) between the pair of consecutive magnetic poles of the second magnet (M2) moving only between the upside (U) and bottomside (B) of the middle second coil (C22).

When designed as described above, maintaining the electromagnetic pairing of the elements for generating the augmented electromagnetic force becomes possible over the entire range for autofocusing or zoom driving operations despite the movement of the second carrier (130).

As described for the first Hall sensors (H1), the second Hall sensors (H2), which face the second magnet (M2) and detect its position, preferably face together the same magnetic pole from the n magnetic poles of the second magnet (M2), but are placed at different locations (along the optical axis) to one another when the second carrier (130) is located at the default position.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. A dual set-up zoom actuator comprising:
a first carrier having a first lens attached thereto and movable along an optical axis;
a second carrier having a second lens attached thereto, said second carrier being capable of moving anterior or posterior to the first carrier along the optical axis;
a housing enclosing the first and second carriers;
a first coil unit equipped to the housing and having n first coils disposed anterior or posterior along the optical axis, wherein n is a natural number equal to or greater than two;
a second coil unit equipped to the housing at a location different than the first coil unit and having n+1 second coils disposed anterior or posterior along the optical axis;
a first magnet having n+1 magnetic poles facing the first coil unit and mounted on the first carrier; and
a second magnet having n magnetic poles facing the second coil unit and mounted on the second carrier,
wherein each of the n first coils is wound to a track-shaped form comprising an upside and a bottomside, said upside and bottomside formed along a direction perpendicular to the optical axis, and
for each pair of two consecutive first coils consisting of a higher first coil and a lower first coil placed at a location lower than the higher first coil, the bottomside of the higher first coil and the upside of the lower first coil face the same magnetic pole out of the n+1 magnetic poles of the first magnet.

2. The dual set-up zoom actuator according to claim 1, wherein the first carrier comprises a first mount equipped with the first lens; and
a first support fitted on the first mount, either left or right thereto; said first support being equipped with the first magnet and extending longer along the optical axis than the first mount.

3. The dual set-up zoom actuator according to claim 2, wherein the second carrier comprises a second mount equipped with the second lens; and
a second support fitted on a side of the second mount, either to the left or right thereof, but opposite the side the first support is fitted thereon, said second support being equipped with the second magnet and extending longer than the second mount along the optical axis.

4. The dual set-up zoom actuator according to claim 3, wherein the second support extends in a direction opposite to the direction the first support extends therein.

5. A dual set-up zoom actuator comprising:
a first carrier having a first lens attached thereto and movable along an optical axis;
a second carrier having a second lens attached thereto, said second carrier being capable of moving anterior or posterior to the first carrier along the optical axis;
a housing enclosing the first and second carriers;
a first coil unit equipped to the housing and having n first coils disposed anterior or posterior along the optical axis, wherein n is a natural number equal to or greater than two;
a second coil unit equipped to the housing at a location different than the first coil unit and having n+1 second coils disposed anterior or posterior along the optical axis;
a first magnet having n+1 magnetic poles facing the first coil unit and mounted on the first carrier; and
a second magnet having n magnetic poles facing the second coil unit and mounted on the second carrier,
wherein each of the n+1 second coils is wound to a track-shaped form comprising an upside and a bottomside, said upside and bottomside formed along a direction perpendicular to the optical axis, and
for each trio of three consecutive second coils consisting of a higher second coil, a middle second coil placed in the middle and a lower second coil placed at a location lower than the middle second coil,
the bottomside of the higher second coil and the upside of the middle second coil face the higher magnetic pole from the pair of two consecutive magnetic poles out of the n magnetic poles of the second magnet, and
the bottomside of the middle second coil and the upside of the lower second coil face the lower magnetic pole from the pair of two consecutive magnetic poles out of the n magnetic poles of the second magnet.

6. The dual set-up zoom actuator according to claim 5, wherein the magnetic border between the pair of two consecutive magnetic poles moves between the upside and the bottomside of the middle second coil.

* * * * *